(12) United States Patent
Noguchi

(10) Patent No.: US 9,157,499 B2
(45) Date of Patent: Oct. 13, 2015

(54) SHOCK ABSORBER

(71) Applicant: KAYABA INDUSTRY CO., LTD., Tokyo (JP)

(72) Inventor: Nobuhiro Noguchi, Toyohashi (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 109 days.

(21) Appl. No.: 14/011,072

(22) Filed: Aug. 27, 2013

(65) Prior Publication Data

US 2013/0341139 A1 Dec. 26, 2013

Related U.S. Application Data

(62) Division of application No. 12/801,676, filed on Jun. 21, 2010, now Pat. No. 8,776,965.

(30) Foreign Application Priority Data

Jun. 23, 2009 (JP) .................................. 2009-148392

(51) Int. Cl.
*F16F 9/346* (2006.01)
*F16F 9/02* (2006.01)

(52) U.S. Cl.
CPC ............. *F16F 9/0209* (2013.01); *F16F 9/0218* (2013.01); *F16F 9/346* (2013.01)

(58) Field of Classification Search
CPC ....... F16F 9/0218; F16F 9/0209; F16F 9/346; F16F 9/48
USPC ............... 188/288, 289, 284, 286; 267/64.22, 267/64.26, 64.18
See application file for complete search history.

(56) References Cited

U.S. PATENT DOCUMENTS

| | | | |
|---|---|---|---|
| 1,655,786 A | 1/1928 | Guerritore | |
| 2,883,181 A | 4/1959 | Hogan | |
| 2,959,410 A | 11/1960 | Fullam et al. | |
| 3,595,349 A | 7/1971 | Ortheil | |
| 4,066,279 A | 1/1978 | Kaptanis | |
| 4,219,190 A | 8/1980 | Nagase | |
| 4,312,499 A * | 1/1982 | Wossner et al. | ............... 267/226 |
| 4,328,960 A | 5/1982 | Handke et al. | |
| 4,360,192 A | 11/1982 | Ishida | |
| 4,544,144 A | 10/1985 | Ishida et al. | |
| 4,787,486 A | 11/1988 | Hrusch et al. | |

(Continued)

FOREIGN PATENT DOCUMENTS

| | | |
|---|---|---|
| DE | 51626 C | 4/1890 |
| DE | 10105432 A1 | 8/2002 |

(Continued)

*Primary Examiner* — Thomas J Williams
*Assistant Examiner* — Mariano Sy
(74) *Attorney, Agent, or Firm* — Rabin & Berdo, P.C.

(57) ABSTRACT

A shock absorber that absorbs a vibration using a working fluid charged into a first chamber and a second chamber comprises a tube body, an inserted body, a tip end of which is inserted into the tube body from an end portion of the tube body, and a partition wall portion that is provided on the tip end of the inserted body to be capable of sliding within the tube body and partitions an interior of the tube body into the first chamber and the second chamber. The shock absorber comprises a connecting portion that is provided within a partition wall portion sliding region of the tube body and connects the first chamber and the second chamber when the partition wall portion passes thereby.

2 Claims, 4 Drawing Sheets

(56) References Cited

U.S. PATENT DOCUMENTS

| | | |
|---|---|---|
| 5,169,131 A | 12/1992 | Shimura |
| 5,862,895 A | 1/1999 | Ricard |
| 5,887,857 A * | 3/1999 | Perrin ........................ 267/64.12 |
| 5,971,117 A * | 10/1999 | Grundei et al. ............... 188/288 |
| 6,135,434 A * | 10/2000 | Marking .................... 267/64.26 |
| 6,776,269 B1 | 8/2004 | Schel |
| 7,104,369 B2 * | 9/2006 | Heyn et al. .................... 188/288 |
| 7,111,711 B2 * | 9/2006 | Grundei ........................ 188/288 |
| 8,479,895 B2 * | 7/2013 | Heyn et al. .................... 188/288 |
| 8,776,965 B2 * | 7/2014 | Noguchi ........................ 188/289 |
| 2005/0016803 A1 | 1/2005 | Brummitt |
| 2008/0277848 A1 | 11/2008 | Davis |
| 2012/0080279 A1 * | 4/2012 | Galasso et al. ................. 188/297 |

FOREIGN PATENT DOCUMENTS

| | | |
|---|---|---|
| GB | 2011018 A | 7/1979 |
| GB | 2202920 A | 10/1988 |
| JP | 2001-501155 T | 1/2001 |
| TW | M303296 | 12/2006 |
| TW | M338923 | 8/2008 |

* cited by examiner

US 9,157,499 B2

SHOCK ABSORBER

CROSS-REFERENCE TO RELATED APPLICATIONS

This is a divisional of co-pending U.S. application Ser. No. 12/801,676, filed Jun. 21, 2010. This U.S. non-provisional patent application claims priority under 35 U.S.C. §119 of Japanese Patent Application No. 2009-148392, filed on Jun. 23, 2009, the entire contents of which are hereby incorporated by reference.

FIELD OF THE INVENTION

This invention relates to a shock absorber that absorbs vibration.

BACKGROUND OF THE INVENTION

JP2001-501155A, published by the Japan Patent Office in 2001, discloses a pneumatic shock absorber used in a front fork of a motorcycle.

In the shock absorber, the interior of a tubular cylinder is partitioned into a first air chamber and a second air chamber by a piston disposed on a tip end of a rod. The shock absorber absorbs vibration caused by irregularities on a road surface using air pressure in the respective air chambers.

SUMMARY OF THE INVENTION

In the shock absorber according to the prior art, the first air chamber and the second air chamber are maintained in an airtight condition by a seal provided on an outer peripheral surface of the piston. However, when vibration having a large amplitude is input such that the shock absorber shifts to a maximum contraction condition or a maximum elongation condition, either the air pressure of the first air chamber or the air pressure of the second air chamber increases excessively.

It is therefore an object of this invention to provide a shock absorber capable of suppressing an excessive increase in the pressure of a working fluid in a working fluid chamber.

To achieve the above object, this invention provides a shock absorber that absorbs a vibration using a working fluid charged into a first chamber and a second chamber and comprises a tube body, an inserted body, a tip end of which is inserted into the tube body from an end portion of the tube body, and a partition wall portion that is provided on the tip end of the inserted body to be capable of sliding within the tube body and partitions an interior of the tube body into the first chamber and the second chamber. The shock absorber comprises a connecting portion that is provided within a partition wall portion sliding region of the tube body and connects the first chamber and the second chamber when the partition wall portion passes thereby.

The details as well as other features and advantages of this invention are set forth in the remainder of the specification and are shown in the accompanying drawings.

DESCRIPTION OF THE PREFERRED EMBODIMENTS

Figure 1:
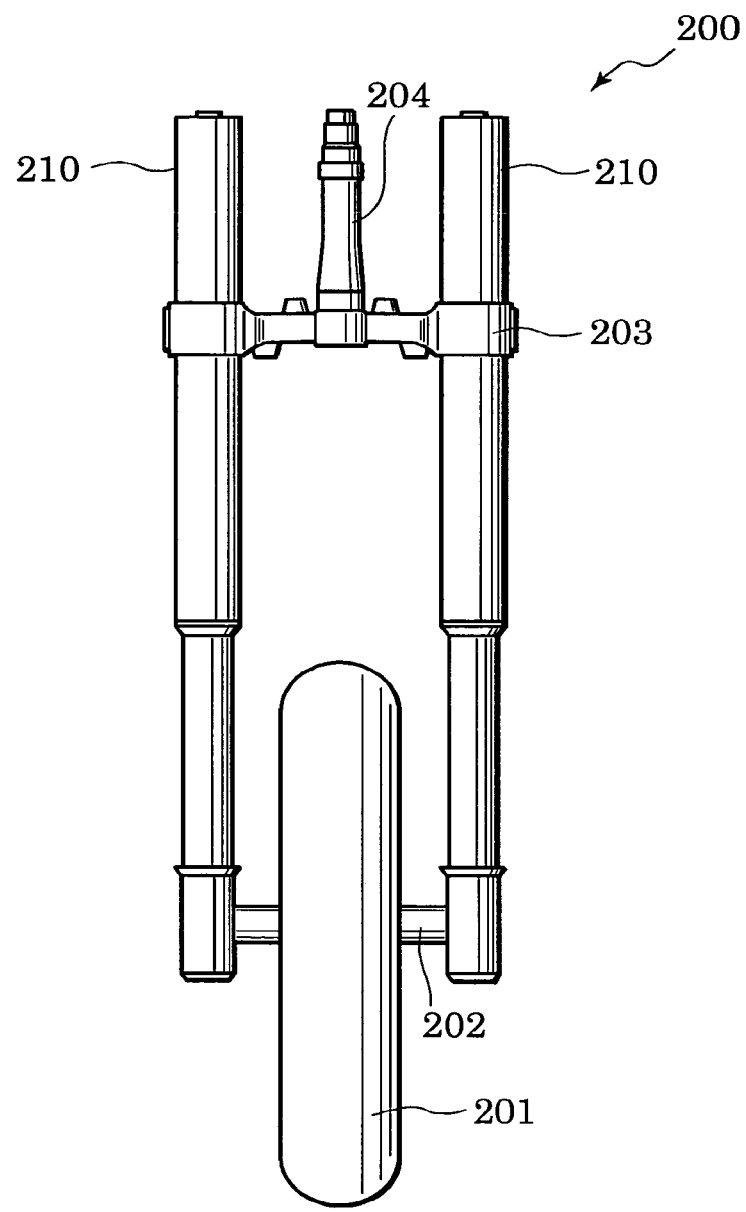
FIG. 1 is a front view of a shock absorber according to a first embodiment of this invention, which is disposed on the right and left sides of a front wheel of a two-wheeled vehicle.
Figure 2:
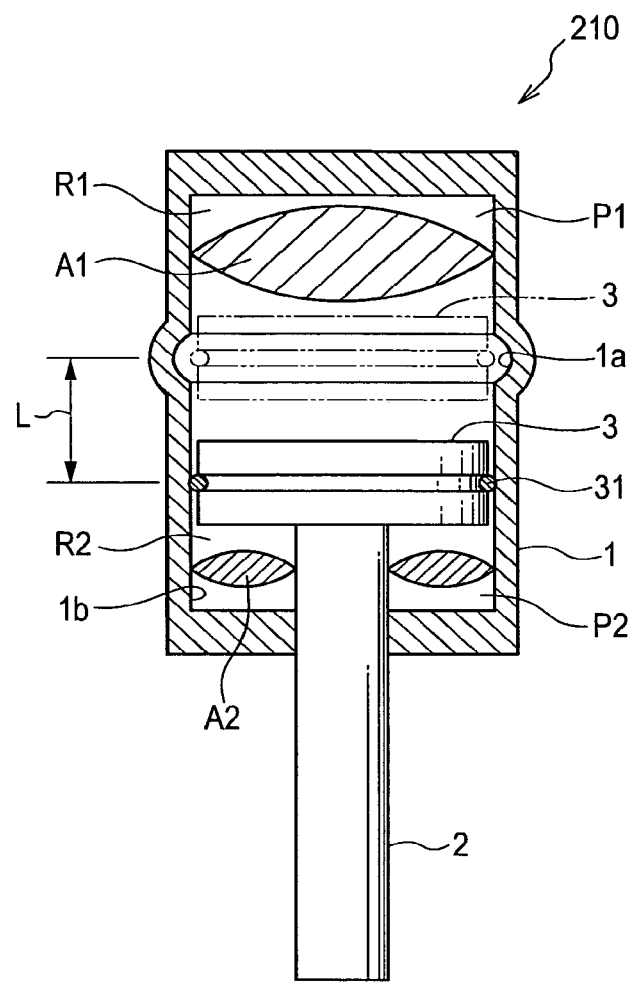
FIG. 2 is a partial longitudinal sectional view of the shock absorber according to the first embodiment.

Referring to FIGS. 1 and 2, a first embodiment of this invention will be described.

Referring to FIG. 1, a shock absorber 210 serving as a front fork is provided on the right and left sides of a front wheel 201 in a two-wheeled vehicle 200. A lower end of the shock absorber 210 is attached to an axle 202 of the front wheel 201 and an upper end thereof is attached to a steering bracket 203 serving as a vehicle body frame. A steering shaft 204 is provided in the center of the steering bracket 203.

Referring to FIG. 2, the constitution of the shock absorber 210 will be described.

The shock absorber 210 is a pneumatic shock absorber that absorbs vibration using an air pressure when the two-wheeled vehicle 200 travels and so on. The shock absorber 210 comprises a tube body 1 having a cylinder 1b, a rod 2, a tip end of which is inserted into the cylinder 1b from a lower end portion of the tube body 1, and a piston 3 formed on the tip end of the rod 2 and provided to be capable of sliding along the cylinder 1b.

The tube body 1 is a tubular member which is attached to the steering bracket 203 in the vicinity of an upper end thereof. The rod 2 is a rod-shaped member, and a lower end of the rod 2 is attached to the axle 202 of the two-wheeled vehicle 200.

The cylinder 1b of the tube body 1 is partitioned into a first air chamber R1 and a second air chamber R2 by the piston 3, which serves as a partition wall portion. Air is charged into the first air chamber R1 and the second air chamber R2 as a working fluid.

A seal 31 is provided on an outer peripheral surface of the piston 3. The seal 31 is an O ring which contacts an inner peripheral surface of the cylinder 1b of the tube body 1 slidingly. Air tightness is secured in the first air chamber R1 and the second air chamber R2 by the seal 31.

An air pressure of the first air chamber R1 is P1 and an air pressure of the second air chamber R2 is P2. Further, a sectional area of the first air chamber R1 is A1 and a sectional area of the second air chamber R2 is A2. The sectional area A2 of the second air chamber R2 takes a value obtained by subtracting a sectional area of the rod 2 from the sectional area A1 of the first air chamber R1.

When air is charged into the first air chamber R1 and the second air chamber R2 of the shock absorber 210, the piston 3 is held in a predetermined air charging position and setting is performed such that the air pressure P1 of the first air chamber R1 is higher than the air pressure P2 of the second air chamber R2. Hence, in a no-load condition, the piston 3 moves within the cylinder 1b to a neutral position in which a product of the air pressure P1 and the sectional area A1 is equal to a product of the air pressure P2 and the sectional area A2, whereby the shock absorber 210 enters an elongated condition.

It should be noted that the air pressure P1 of the first air chamber R1 may be set identically to the air pressure P2 of the second air chamber R2 during air charging. Since the sectional area A1 of the first air chamber R1 is larger than the sectional area A2 of the second air chamber R2, the shock absorber 210 enters the elongated condition in the no-load condition.

When the shock absorber 210 contracts such that the piston 3 ascends from the neutral position, the air pressure P1 of the first air chamber R1 increases beyond the air pressure P2 of the second air chamber R2. An air spring force of $P1 \times A1 - P2 \times A2$ acts on the piston 3 in an elongation direction of the shock absorber 210, and this air spring force serves as a contraction side damping force. When the rod 2 penetrates the cylinder 1b of the tube body 1 by a large stroke such that the shock absorber 210 is maximally contracted, the air spring force of the first air chamber R1 reaches a maximum, and therefore the piston 3 is prevented from colliding with an upper end of the cylinder 1b.

On the other hand, when the shock absorber 210 elongates such that the piston 3 descends from the neutral position, the air pressure P2 of the second air chamber R2 increases beyond the air pressure P1 of the first air chamber R1. An air spring force of $P2 \times A2 - P1 \times A1$ acts on the piston 3 in a contraction direction of the shock absorber 210, and this air spring force serves as an elongation side damping force. When the rod 2 withdraws from the cylinder 1b of the tube body 1 by a large stroke such that the shock absorber 210 is maximally elongated, the air spring force of the second air chamber R2 reaches a maximum, and therefore the piston 3 is prevented from colliding with a lower end of the cylinder 1b.

The shock absorber 210 absorbs vibration using the air pressure, and therefore, in comparison with a shock absorber that absorbs vibration using a coil spring or the like, the number of constitutional components can be reduced, leading to reductions in the weight and manufacturing cost of the shock absorber 210.

Figure 4:
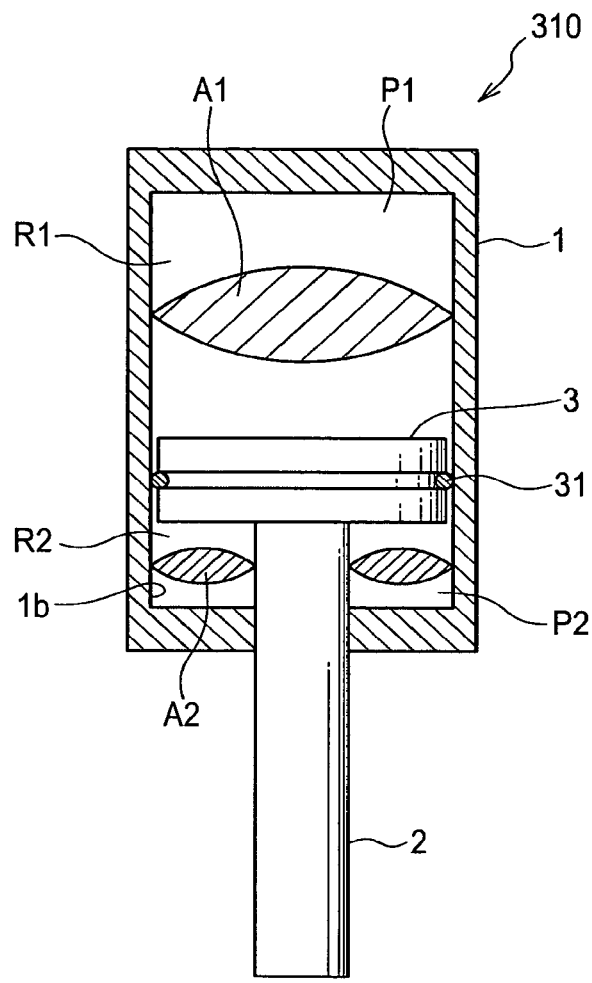
FIG. 4 is a partial longitudinal sectional view of a conventional shock absorber.

Incidentally, as shown in FIG. 4, in a conventional shock absorber 310, similarly to the shock absorber 210, the interior of the cylinder 1b of the tube body 1 is partitioned into the first air chamber R1 and the second air chamber R2 by the piston 3 provided on the tip end of the rod 2.

In the conventional shock absorber 310, a problem arises in that when vibration having a large amplitude is input such that the piston 3 approaches the upper end of the cylinder 1b to a maximum extent, the air pressure P1 of the first air chamber R1 becomes extremely high. In a case where the seal 31 of the piston 3 is worn, the air in the first air chamber R1 leaks into the second air chamber R2 through a gap between the piston 3 and the cylinder 1b when the air pressure P1 of the first air chamber R1 is extremely high. As a result, it becomes more difficult for the air pressure of the first air chamber R1 and the second air chamber R2 to act on the piston 3, and therefore a vibration damping effect generated by the shock absorber 310 deteriorates. In such cases, measures such as replacing the worn seal 31 must be taken to restore the shock absorber 310 to its initial condition.

In response to this problem, in the shock absorber 210, a connecting portion 1a capable of connecting the first air chamber R1 to the second air chamber R2 in accordance with the position of the piston 3 is provided within a sliding region of the piston 3, and the connecting portion 1a prevents the air pressure of the first air chamber R1 and the second air chamber R2 from becoming excessively high.

As shown in FIG. 2, the connecting portion 1a is an annular groove formed by indenting an inner peripheral surface of the cylinder 1b of the tube body 1. A groove width of the connecting portion 1a is set to be larger than a thickness of the seal 31 on the piston 3 and smaller than a thickness of the piston 3.

Taking a maximally elongated position in which the piston 3 most closely approaches a lower end portion of the tube body 1 as a reference position, the connecting portion 1a is disposed in a position upwardly removed from the seal 31, which is disposed on the piston 3 positioned in the reference position, by a predetermined stroke L. The predetermined stroke L is determined arbitrarily within a range that allows the piston 3 to pass.

Alternatively, taking a maximally contracted position in which the piston 3 most closely approaches an upper end portion of the tube body 1 as the reference position, the connecting portion 1a may be disposed a position downwardly removed from the seal 31, which is disposed on the piston 3 positioned in the reference position, by the predetermined stroke L.

When vibration having a large amplitude is input into the shock absorber 210, the piston 3 ascends within the cylinder 1b, and while ascending passes the connecting portion 1a. The air pressure of the first air chamber R1 increases in accordance with the ascent of the piston 3 until the piston 3 passes the connecting portion 1a. When the seal 31 of the piston 3 reaches the connecting portion 1a, the first air chamber R1 and the second air chamber R2 temporarily communicate with each other via the connecting portion 1a, and therefore the air pressure of the first air chamber R1 temporarily decreases. When the piston 3 then ascends past the connecting portion 1a, the air pressure of the first air chamber R1 rises again.

Hence, in the shock absorber 210, the air pressure of the high pressure-side first air chamber R1 can be temporarily reduced when the seal 31 of the piston 3 passes the connecting portion 1a. As a result, an excessive increase in the air pressure of the first air chamber R1 can be suppressed even if the piston 3 continues to ascend thereafter.

In a case where the seal 31 of the piston 3 passes the connecting portion 1a when the piston 3 descends from the maximally contracted position within the cylinder 1b such that the air pressure in the second air chamber R2 of the shock absorber 210 increases beyond that of the first air chamber R1, the air pressure of the high pressure-side second air chamber R2 can be temporarily reduced. As a result, an excessive increase in the air pressure of the second air chamber R2 can be suppressed even if the piston 3 continues to descend thereafter.

In the shock absorber 210, an abnormal pressure increase in the air pressure of the first air chamber R1 and the second air chamber R2 can be suppressed through a simple constitution according to which the connecting portion 1a is formed on the inner peripheral surface of the cylinder 1b. Accordingly, the seal 31 provided on the piston 3 is less likely to become worn. Furthermore, in the shock absorber 210, in contrast to a conventional shock absorber, there is no need to increase a pressure resistance characteristic of the seal 31, and therefore an inexpensive seal 31 can be employed, leading to a reduction in component cost.

Figure 3:
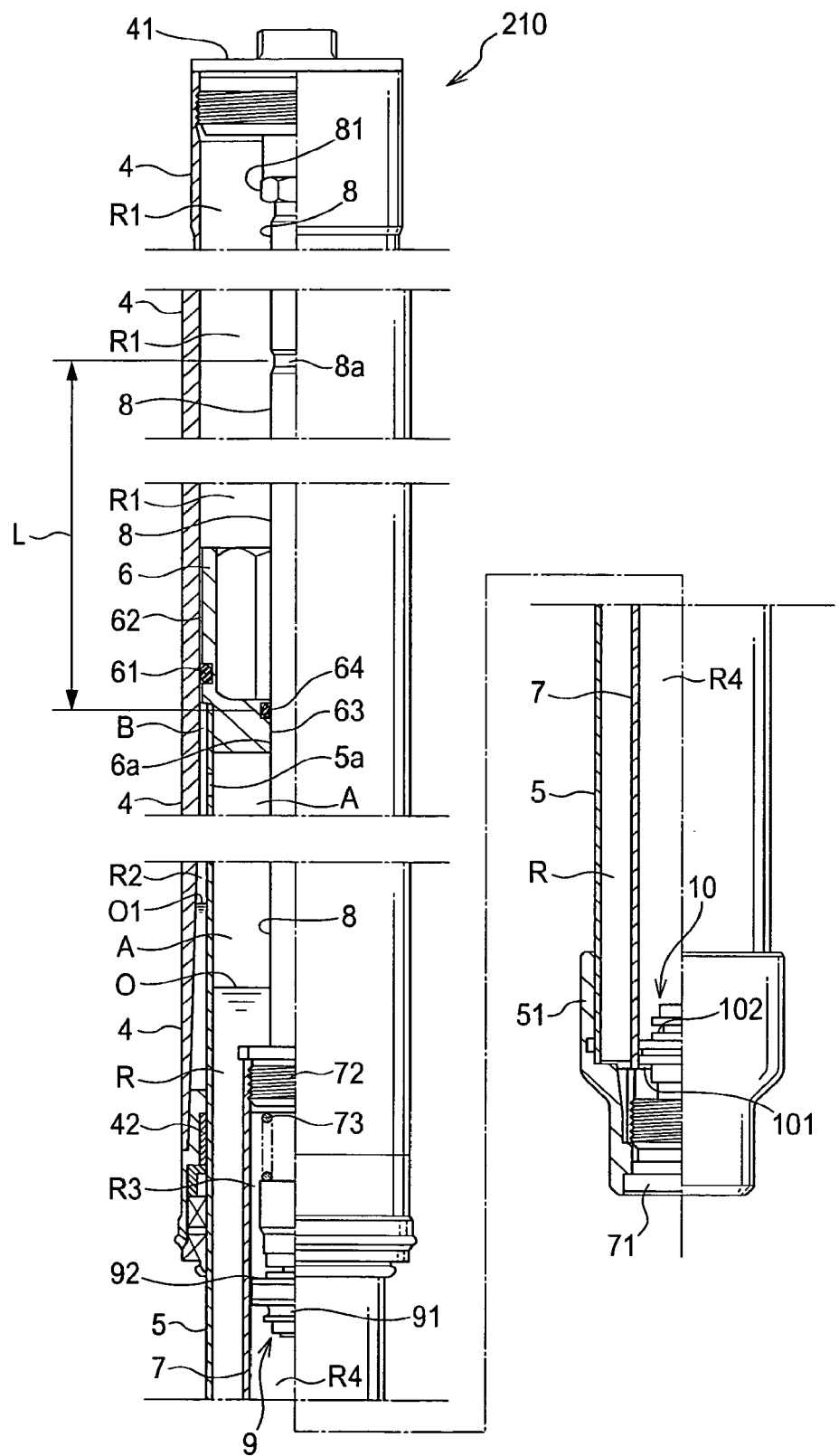
FIG. 3 is a partial longitudinal sectional view of a shock absorber according to a second embodiment of this invention.

Referring to FIG. 3, a second embodiment of this invention will be described.

The shock absorber 210 shown in FIG. 3 is a shock absorber that absorbs vibration using an air pressure and an oil pressure.

The shock absorber 210 comprises a vehicle body side tube 4 attached to the steering bracket 203, and a vehicle wheel side tube 5 that is attached to the axle 202 of the front wheel 201 and inserted into the vehicle body side tube 4 to be capable of sliding.

The vehicle body side tube 4 is formed from a cylindrical member. An upper end of the vehicle body side tube 4 is closed by a cap member 41. A damper rod 8 constituting a hydraulic damper mechanism is disposed on a lower end portion of the cap member 41 via a lock nut 81. The damper rod 8 projects downward from the cap member 41 in an axial center direction of the vehicle body side tube 4.

A sliding contact portion 42 that contacts an outer peripheral surface of the vehicle wheel side tube 5 slidingly is provided on an opening end of the vehicle body side tube 4.

The vehicle wheel side tube 5 is a cylindrical member, and an outer diameter of the vehicle wheel side tube 5 is formed to be smaller than an inner diameter of the vehicle body side tube 4. A lower end of the vehicle wheel side tube 5 is closed by a cap member 51. An upper end of the vehicle wheel side tube 5 is closed by a sliding body 6 formed to be capable of sliding relative to an inner peripheral surface of the vehicle body side tube 4.

A cylindrical damper cylinder 7 constituting the hydraulic damper mechanism is formed in the interior of the vehicle wheel side tube 5. The damper cylinder 7 is formed to project from the lower end portion of the vehicle wheel side tube 5 in an axial center direction of the vehicle wheel side tube 5. An upper end of the damper cylinder 7 is closed by a rod guide 72 penetrated by the damper rod 8. A spring 73 that absorbs an acting force to prevent the damper rod 8 from colliding with a lower end portion of the rod guide 72 during maximum elongation of the shock absorber 210 is disposed between a tip end of the damper rod 8 positioned within the damper cylinder 7 and a lower end portion of the rod guide 72.

The damper cylinder 7 is partitioned into a rod side oil chamber R3 and a piston side oil chamber R4 by a piston 9 provided on a tip end of the damper rod 8. Working oil is charged into the rod side oil chamber R3 and the piston side oil chamber R4.

Working oil exists in the vehicle wheel side tube 5 on the outside of the damper cylinder 7, as indicated by an oil surface O. A part of the vehicle wheel side tube 5 in which the working oil exists serves as a reservoir chamber R, and a space above the reservoir chamber R serves as an inside air chamber A.

The piston 9 provided on the tip end of the damper rod 8 is provided to be free to slide within the damper cylinder 7. The piston 9 includes two connecting passages for connecting the rod side oil chamber R3 and the piston side oil chamber R4. An elongation side damping valve 91 is provided in one of the connecting passages, and a check valve 92 is provided in the other connecting passage.

The elongation side damping valve 91 opens when the pressure of the working oil in the rod side oil chamber R3 increases beyond a predetermined value, thereby allowing working oil to flow only from the rod side oil chamber R3 into the piston side oil chamber R4. When the working oil passes through the elongation side damping valve 91, resistance is generated, and this resistance serves as an elongation side damping force.

The check valve 92 prohibits working oil from flowing out of the rod side oil chamber R3 into the piston side oil chamber R4 and allows working oil to flow from the piston side oil chamber R4 into the rod side oil chamber R3.

A base valve 10 including a contraction side damping valve 101 and a check valve 102 is disposed in the lower end portion of the damper cylinder 7. The base valve 10 is fixed to the cap member 51 via a bolt 71 so as to face the interior of the damper cylinder 7.

The base valve 10 includes two connecting passages for connecting the piston side oil chamber R4 and the reservoir chamber R. The contraction side damping valve 101 is provided in one of the connecting passages, and the check valve 102 is provided in the other connecting passage.

The contraction side damping valve 101 opens when the pressure of the working oil in the piston side oil chamber R4 increases beyond a predetermined value, thereby allowing working oil to flow only from the piston side oil chamber R4 into the reservoir chamber R. When the working oil passes through the contraction side damping valve 101, resistance is generated, and this resistance serves as a contraction side damping force. When the shock absorber 210 contracts, an amount of working oil corresponding to a volume by which the rod infiltrates the rod side oil chamber R3 flows out of the piston side oil chamber R4 into the reservoir chamber R.

The check valve 102 prohibits working oil from flowing out of the piston side oil chamber R4 into the reservoir chamber R and allows working oil to flow from the reservoir chamber R into the piston side oil chamber R4. When the shock absorber 210 elongates, an amount of working oil corresponding to a volume by which the rod withdraws from the rod side oil chamber R3 flows out of the reservoir chamber R into the piston side oil chamber R4.

The shock absorber 210 includes the hydraulic damper mechanism constituted by the damper rod 8, the piston 9, the damper cylinder 7, and so on such that during elongation, the elongation side damping force is generated by the elongation side damping valve 91 of the piston 9 and during contraction, the contraction side damping force is generated by the contraction side damping valve 101 of the base valve 10.

Further, the shock absorber 210 generates a contraction side damping force using the air pressure of the first air chamber R1, which is formed in the vehicle body side tube 4 above the sliding body 6, and generates an elongation side damping force using an air pressure of an outside air chamber B, which is formed below the sliding body 6 between the vehicle body side tube 4 and the vehicle wheel side tube 5, and an air pressure of the inside air chamber A of the vehicle wheel side tube 5.

The inside air chamber A is formed in the interior of the vehicle wheel side tube 5, which is closed by the sliding body 6, and communicates with the outside air chamber B via a connecting hole 5a provided in a side portion of the vehicle wheel side tube 5. In the shock absorber 210, the second air chamber R2 is formed by the inside air chamber A and the outside air chamber B.

The sliding body 6 provided on the upper end of the vehicle wheel side tube 5 is a partition wall portion that partitions the interior of the shock absorber 210 into the first air chamber R1 and the second air chamber R2. The sliding body 6 includes a seal 61 and a sliding portion 62 on an outer peripheral surface thereof.

The seal 61 is an O ring that contacts an inner peripheral surface of the vehicle body side tube 4 slidingly. Air tightness is secured in the first air chamber R1 and the outside air chamber B by the seal 61. It should be noted that lubrication working oil for enhancing a sliding property of the vehicle body side tube 4 and the vehicle wheel side tube 5 is stored in the outside air chamber B, as indicated by an oil surface O1.

The sliding portion 62 is formed as a surface which is capable of sliding relative to the vehicle body side tube 4, thereby enhancing a sliding property of the sliding body 6.

The sliding body 6 also includes an insertion hole 6a penetrated by the damper rod 8. The sliding portion 63 and the seal 64 are provided in the insertion hole 6a of the sliding body 6.

The sliding portion 63 is formed as a surface which is capable of sliding relative to the damper rod 8, thereby enhancing the sliding property of the sliding body 6. It should be noted that the damper rod 8 also functions as a guide rod that guides a vertical motion of the sliding body 6.

The seal 64 is an O ring that contacts an outer peripheral surface of the damper rod 8 slidingly. Air tightness is secured in the first air chamber R1 and the inside air chamber A by the seal 64.

In the shock absorber 210, the air pressure of the first air chamber R1 is P1 and the air pressure of the second air chamber R2 constituted by the inside air chamber A and the outside air chamber B is P2. Further, the sectional area of the first air chamber R1 is A1 and the sectional area of the second air chamber R2 is A2. The sectional area A2 of the second air chamber R2 is approximately equal to a value obtained by subtracting a sectional area of the damper rod 8 from the sectional area A1 of the first air chamber R1.

When air is charged into the first air chamber R1 and the second air chamber R2, the sliding body 6 is held in a predetermined air charging position and setting is performed such that the air pressure P1 of the first air chamber R1 is higher than the air pressure P2 of the second air chamber R2. Hence, in a no-load condition, the sliding body 6 moves to a neutral position in which the product of the air pressure P1 and the sectional area A1 is equal to the product of the air pressure P2 and the sectional area A2, whereby the shock absorber 210 enters an elongated condition.

It should be noted that the air pressure P1 of the first air chamber R1 may be set identically to the air pressure P2 of the second air chamber R2 during air charging. Since the sectional area A1 of the first air chamber R1 is larger than the sectional area A2 of the second air chamber R2, the shock absorber 210 enters the elongated condition in the no-load condition.

When the shock absorber 210 contracts such that the sliding body 6 ascends from the neutral position, the air pressure P1 of the first air chamber R1 increases beyond the air pressure P2 of the second air chamber R2. An air spring force of P1×A1−P2×A2 acts on the sliding body 6 in the elongation direction of the shock absorber 210, and this air spring force serves as the contraction side damping force. When the vehicle wheel side tube 5 penetrates the vehicle body side tube 4 by a large stroke such that the shock absorber 210 is maximally contracted, the air spring force of the first air chamber R1 reaches a maximum, and therefore the sliding body 6 is prevented from colliding with an upper end of the vehicle body side tube 4.

On the other hand, when the shock absorber 210 elongates such that the sliding body 6 descends from the neutral position, the air pressure P2 of the second air chamber R2 increases beyond the air pressure P1 of the first air chamber R1. An air spring force of P2×A2−P1×A1 acts on the sliding body 6 in the contraction direction of the shock absorber 210, and this air spring force serves as the elongation side damping force. When the vehicle wheel side tube 5 withdraws from the vehicle body side tube 4 by a large stroke such that the shock absorber 210 is maximally elongated, the air spring force of the second air chamber R2 reaches a maximum, and therefore the sliding body 6 is prevented from colliding with the sliding contact portion 42 of the vehicle body side tube 4.

The shock absorber 210 absorbs vibration using the air pressure and the oil pressure, and therefore, in comparison with a shock absorber that absorbs vibration using a coil spring or the like, the number of constitutional components can be reduced, leading to reductions in the weight and manufacturing cost of the shock absorber 210.

A connecting portion 8a capable of connecting the first air chamber R1 to the second air chamber R2 in accordance with the position of the sliding body 6 is provided in the shock absorber 210 within the sliding region of the sliding body 6. The connecting portion 8a prevents the air pressure of the first air chamber R1 and the second air chamber R2 from becoming excessively high.

The connecting portion 8a is an annular groove formed by indenting an outer peripheral surface of the damper rod 8 of the vehicle body side tube 4. A groove width of the connecting portion 8a is set to be larger than a thickness of the seal 64 on the sliding body 6 and smaller than a formation length of the insertion hole 6a in the sliding body 6.

Taking a maximally elongated position in which the sliding body 6 most closely approaches a lower end portion of the vehicle body side tube 4 as a reference position, the connecting portion 8a is disposed in a position upwardly removed from the seal 64, which is disposed on the sliding body 6 positioned in the reference position, by a predetermined stroke L. The predetermined stroke L is determined arbitrarily within a range that allows the sliding body 6 to pass.

Alternatively, taking a maximally contracted position in which the sliding body 6 most closely approaches an upper end portion of the vehicle body side tube 4 as the reference position, the connecting portion 8a may be disposed a position downwardly removed from the seal 64, which is disposed on the sliding body 6 positioned in the reference position, by the predetermined stroke L.

When vibration having a large amplitude is input into the shock absorber 210, the sliding body 6 ascends within the vehicle side tube 4, and while ascending passes the connecting portion 8a of the damper rod 8. The air pressure of the first air chamber R1 increases in accordance with the ascent of the sliding body 6 until the sliding body 6 passes the connecting portion 8a. When the seal 64 of the sliding body 6 reaches the connecting portion 8a, the first air chamber R1 and the inside air chamber A temporarily communicate with each other via the connecting portion 8a, and therefore the air pressure of the first air chamber R1 temporarily decreases. When the sliding body 6 then ascends past the connecting portion 8a, the air pressure of the first air chamber R1 rises again.

Hence, in the shock absorber 210, the air pressure of the high pressure-side first air chamber R1 can be temporarily reduced when the seal 64 of the sliding body 6 passes the connecting portion 8a. As a result, an excessive increase in the air pressure of the first air chamber R1 can be suppressed even if the sliding body 6 continues to ascend thereafter.

In a case where the seal 64 of the sliding body 6 passes the connecting portion 8a when the sliding body 6 descends from the maximally contracted position within the vehicle body side tube 4 such that the air pressure in the second air chamber R2 of the shock absorber 210 increases beyond that of the first air chamber R1, the air pressure of the high pressure-side second air chamber R2 can be temporarily reduced. As a result, an excessive increase in the air pressure of the second air chamber R2 can be suppressed even if the sliding body 6 continues to descend thereafter.

In the shock absorber 210, an abnormal pressure increase in the air pressure of the first air chamber R1 and the second air chamber R2 can be suppressed through a simple constitution according to which the connecting portion 8a is formed on the outer peripheral surface of the damper rod 8, and therefore similar effects to those of the first embodiment can be obtained. Moreover, the shock absorber 210 includes the hydraulic damper mechanism, and therefore a vibration absorption effect can be enhanced, making the shock absorber 210 even more suitable for the two-wheeled vehicle 200.

The contents of JP2009-148392, with a filing date of Jun. 23, 2009 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

In the first and second embodiments, the shock absorber 210 is used as a front fork of the two-wheeled vehicle 200, but may be used in a motorcycle or another machine.

In the first embodiment, the connecting portion 1a is formed as an annular groove extending along the inner periphery of the cylinder 1b, but may be formed as a recess portion having width in an up-down direction of the cylinder 1b. It should be noted that the recess portion may be provided in a plurality along the inner periphery of the cylinder 1b.

In the second embodiment, the connecting portion 8a is formed as an annular groove extending along the outer periphery of the damper rod 8, but may be formed as a recess portion having width in an up-down direction of the damper rod 8. It should be noted that the recess portion may be provided in a plurality along the outer periphery of the damper rod 8.

The embodiments of this invention in which an exclusive property or privilege are claimed are defined as follows:

What is claimed is:

1. A shock absorber that absorbs a vibration using a working fluid charged into a first chamber and a second chamber and comprises a tube body, a rod, a tip end of which is inserted into the tube body from an end portion of the tube body, and a piston that is provided on the tip end of the rod and partitions an interior of the tube body into the first chamber and the second chamber, the shock absorber comprising:
    an outside seal that is provided on an outer peripheral surface of the piston and contacts an inner peripheral surface of the tube body slidingly; and
    a connecting portion that is formed on the inner peripheral surface of the tube body and temporarily connects the first chamber and the second chamber when the outside seal passes the connecting portion,
    wherein the connecting portion is formed as an annular groove by indenting the inner peripheral surface of the tube body,
    a width of the connecting portion is set to be larger than a thickness of the outside seal and to be smaller than a thickness of the piston, and
    air is charged into the first chamber and the second chamber as the working fluid.

2. The shock absorber as defined in claim 1, wherein the connecting portion is formed in a position removed from a reference position, in which the piston most closely approaches one end portion or another end portion of the tube body, by a predetermined stroke.

* * * * *